(12) United States Patent
Williams et al.

(10) Patent No.: US 10,589,694 B2
(45) Date of Patent: Mar. 17, 2020

(54) SENSOR INTEGRATION INTO EXISTING VEHICLE STRUCTURES

(71) Applicant: Toyota Motor Engineering & Manufacturing North America, Inc., Erlanger, KY (US)

(72) Inventors: Paxton S. Williams, Milan, MI (US); Christopher M. Higgins, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 38 days.

(21) Appl. No.: 15/186,389

(22) Filed: Jun. 17, 2016

(65) Prior Publication Data
US 2017/0364086 A1 Dec. 21, 2017

(51) Int. Cl.
*B60R 11/00* (2006.01)
*G01S 7/481* (2006.01)
(Continued)

(52) U.S. Cl.
CPC ............ *B60R 11/00* (2013.01); *B60R 13/005* (2013.01); *G01S 7/4813* (2013.01); *G01S 13/931* (2013.01);
(Continued)

(58) Field of Classification Search
None
See application file for complete search history.

(56) References Cited

U.S. PATENT DOCUMENTS 6,184,842 B1 2/2001 Leinweber et al.
8,139,109 B2 * 3/2012 Schmiedel ............ G01S 17/023
348/118

(Continued)

FOREIGN PATENT DOCUMENTS

EP 1045471 A1 * 10/2000 ........... H01Q 1/3233
JP 2000304846 A * 11/2000

OTHER PUBLICATIONS

Toyota Safety Sense (TSS), retrieved from the Internet: <https://web.archive.org/web/20161007061232/http:// www.toyota.com/safety-sense/>, website <http://www.toyota.com/safety-sense/> archived Oct. 7, 2016 (9 pages).

*Primary Examiner* — Christian Chace
*Assistant Examiner* — Edward Torchinsky
(74) *Attorney, Agent, or Firm* — Christopher G. Darrow; Darrow Mustafa PC (57) ABSTRACT

One or more vehicle sensors can be integrated into existing vehicle housings or structures to provide a streamlined appearance, potentially improved sensing capabilities, and a reduction in the use of extra structures to hold the one or more vehicle sensors. In one or more arrangements, one or more vehicle sensors can be located within a body of the vehicle and can be spaced from the vehicle emblem in a longitudinal direction of the vehicle. The one or more sensors can be configured and/or operatively positioned to sense at least a portion of an external environment of the vehicle through the vehicle emblem. In one or more arrangements, one or more sensors can be located within a front grille of the vehicle. The one or more sensors are configured to sense at least a portion of an external environment of the vehicle through the front grille.

14 Claims, 7 Drawing Sheets

(51) Int. Cl.
*B60R 13/00* (2006.01)
*G01S 13/931* (2020.01)
*G01S 17/93* (2020.01)
*G01S 17/00* (2020.01)
G01S 15/931 (2020.01)
G01S 13/93 (2020.01)

(52) U.S. Cl.
CPC ............ *G01S 17/00* (2013.01); *G01S 17/936* (2013.01); *G01S 2013/9375* (2013.01); *G01S 2015/937* (2013.01)

(56) References Cited

U.S. PATENT DOCUMENTS

| | | |
|---|---|---|
| 8,922,655 B2 * | 12/2014 | Forgue .................... B60R 19/52 224/309 |
| 2003/0193613 A1 | 10/2003 | Matko et al. |
| 2007/0115434 A1 * | 5/2007 | Oba ........................ B60R 13/00 352/243 |
| 2007/0182817 A1 * | 8/2007 | Briggance ............... B60R 11/04 348/118 |
| 2010/0085271 A1 | 4/2010 | Tajima |
| 2013/0215271 A1 * | 8/2013 | Lu ........................... H04N 7/18 348/148 |
| 2014/0247349 A1 | 9/2014 | Heard |
| 2015/0109449 A1 | 4/2015 | Endo et al. |
| 2017/0036673 A1 * | 2/2017 | Lee ........................ A61B 3/112 |

* cited by examiner

SENSOR INTEGRATION INTO EXISTING VEHICLE STRUCTURES

FIELD

The subject matter described herein relates in general to vehicles and, more particularly, to sensors for vehicles.

BACKGROUND

Some vehicles include an operational mode in which a computing system is used to navigate and/or maneuver the vehicle along a travel route with minimal or no input from a human driver. Such vehicles include sensors that are configured to detect information about the surrounding environment, including the presence of objects in the environment. In many instances, the vehicle can include more than one type of sensor. The computing systems are configured to process the detected information to determine how to navigate and/or maneuver the vehicle through the surrounding environment.

SUMMARY

In one respect, the present disclosure is directed to a sensor system. The system can include a vehicle emblem. The system can include one or more environment sensors. The one or more environment sensors can be located within a body of a vehicle. The one or more environment sensors can be spaced from the vehicle emblem in a longitudinal direction of the vehicle. The one or more environment sensors can be substantially aligned with the emblem. The one or more environment sensors can be configured to sense at least a forward portion of an external environment of the vehicle through the emblem.

In another respect, the present disclosure is directed to a sensor system for a vehicle. The system can include a vehicle emblem. An aperture can be defined in the vehicle emblem. The system can include a radiator. The radiator can be located rearward from the vehicle emblem in a longitudinal direction of the vehicle. The system can include one or more sensors. The one or more sensors can be located between the vehicle emblem and the radiator. The one or more sensors can be spaced rearward from the vehicle emblem in a longitudinal direction of the vehicle. The one or more sensors can be substantially aligned with the vehicle emblem. The one or more sensors can be configured to sense at least a portion of an external environment of the vehicle. The aperture in the vehicle emblem can facilitate airflow to the one or more sensors for cooling of the one or more sensors and/or can facilitate airflow to the radiator for engine cooling.

In another respect, the present disclosure is directed to a sensor system for a vehicle. The system can include a front grille for the vehicle. At least a portion of the front grille can be hollow. The system can include one or more environment sensors. The one or more environment sensors can be located within the front grille. The one or more environment sensors can be configured to sense at least a forward portion of an external environment of the vehicle through a walls of the front grille.

DETAILED DESCRIPTION

A vehicle, such as an autonomous vehicle or semi-autonomous vehicle, can include one or more environment sensors to sense aspects of the external environment of the vehicle. The one or more vehicle sensors can be integrated into existing vehicle housings or structures. For instance, one or more environment sensors can be located within a body of the vehicle behind a vehicle emblem in a longitudinal direction of the vehicle. The one or more environment sensors can be configured and/or operatively positioned to sense at least a forward portion of an external environment of the vehicle through the emblem. In one or more arrangements, one or more environment sensors can be located within a front grille of the vehicle. The one or more environment sensors can be configured to sense at least a forward portion of an external environment of the vehicle through a wall of the front grille. The present detailed description relates to systems, methods and apparatus that incorporate such features. In at least some instances, by integrating the one or more environment sensors into an existing vehicle housing, space within the vehicle can be optimized, a streamlined appearance can be achieved, and/or the operation of the one or more sensors can be potentially improved.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Figure 1:
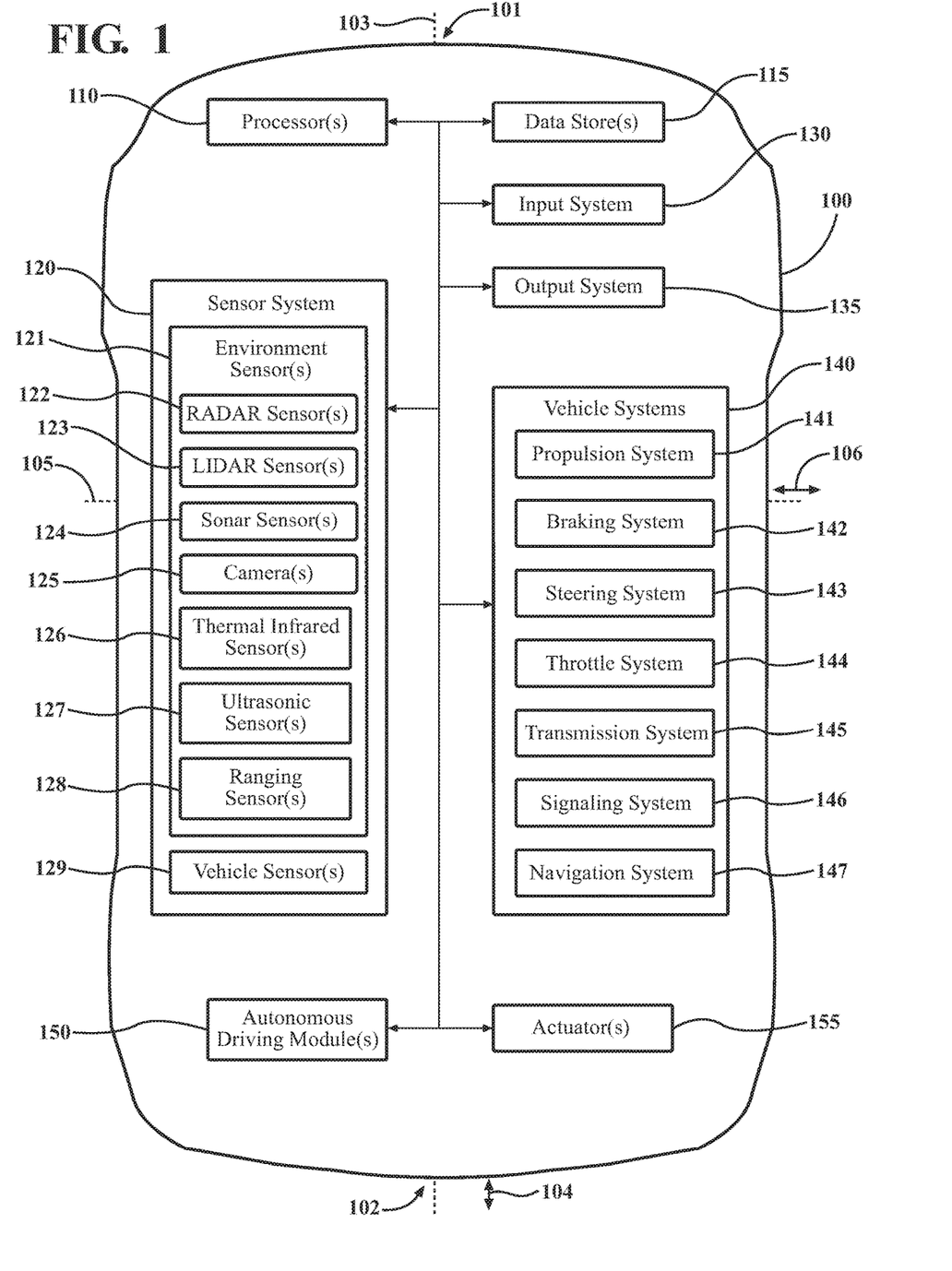
FIG. 1 is an example of a vehicle.

Referring to FIG. 1, an example a vehicle 100 is shown. As used herein, "vehicle" means any form of motorized transport. In one or more implementations, the vehicle 100 can be an automobile. While arrangements will be described herein with respect to automobiles, it will be understood that embodiments are not limited to automobiles. In some implementations, the vehicle 100 may be a watercraft, an aircraft or any other form of motorized transport.

In one or more arrangements, the vehicle 100 can be an autonomous vehicle. As used herein, "autonomous vehicle" means a vehicle that configured to operate in an autonomous operational mode. "Autonomous operational mode" means that one or more computing systems are used to navigate and/or maneuver the vehicle along a travel route with minimal or no input from a human driver. In one or more arrangements, the vehicle 100 can be highly automated or completely automated.

The vehicle 100 can have one or more semi-autonomous operational modes in which a portion of the navigation and/or maneuvering of the vehicle along a travel route is performed by one or more computing systems, and a portion of the navigation and/or maneuvering of the vehicle along a travel route is performed by a human driver. Examples of a semi-autonomous operational mode include one in which an adaptive cruise control, lane keeping, and/or cruise control is activated. The vehicle 100 can have a manual operational mode in which all of or a majority of the navigation and/or maneuvering of the vehicle is performed by a human driver. In one or more arrangements, the vehicle 100 can be a conventional vehicle that is configured to operate in only a manual mode. The vehicle 100 can be configured to be switched, automatically or selectively, between the various operational modes in any suitable manner, now known or later developed.

The vehicle 100 can have a forward end region 101 and a rearward end region 102. The vehicle 100 can have an associated longitudinal axis 103. The vehicle 100 can have an associated longitudinal direction 104. "Longitudinal direction" means any direction that is substantially parallel to and/or co-linear with the longitudinal axis 103. The vehicle 100 can have an associated lateral axis 105, which can be substantially perpendicular to the longitudinal axis 103. As used herein, the term "substantially" includes exactly the term it modifies and slight variations therefrom. The vehicle 100 can have an associated lateral direction 106. "Lateral direction" means any direction that is substantially parallel to and/or co-linear with the lateral axis 105.

The vehicle 100 can include various elements. Some of the possible elements of the vehicle 100 are shown in FIG. 1 and will now be described. It will be understood that it is not necessary for the vehicle 100 to have all of the elements shown in FIG. 1 or described herein. The vehicle 100 can have any combination of the various elements shown in FIG. 1. Further, the vehicle 100 can have additional elements to those shown in FIG. 1. In some arrangements, the vehicle 100 may not include one or more of the elements shown in FIG. 1. Further, while the various elements are shown as being located within the vehicle 100 in FIG. 1, it will be understood that one or more of these elements can be located anywhere on the vehicle, including external to the vehicle 100. Further, the elements shown may be physically separated by large distances.

The vehicle 100 can include one or more processors 110. "Processor" means any component or group of components that are configured to execute any of the processes described herein or any form of instructions to carry out such processes or cause such processes to be performed. The processor(s) 110 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 110 can include at least one hardware circuit (e.g., an integrated circuit) configured to carry out instructions contained in program code. In arrangements in which there is a plurality of processors 110, such processors can work independently from each other or one or more processors can work in combination with each other. In one or more arrangements, the processor(s) 110 can be a main processor of the vehicle 100. For instance, the processor(s) 110 can be an electronic control unit (ECU).

The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact. The data store(s) 115 can store any suitable type of data. For example, in one or more arrangements, the one or more data stores 115 can include map data and/or terrain data, which can be high quality and/or highly detailed.

The data store(s) 115 can be communicatively linked to one or more elements of the vehicle 100 through one or more communication networks. As used herein, the term "communicatively linked" can include direct or indirect connections through a communication channel or pathway or another component or system. A "communication network" means one or more components designed to transmit and/or receive information from one source to another. The data store(s) 115 and/or one or more of the elements of the vehicle 100 can include and/or execute suitable communication software, which enables the various elements to communicate with each other through the communication network and perform the functions disclosed herein.

The one or more communication networks can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The communication network further can be implemented as or include one or more wireless networks, whether short range (e.g., a local wireless network built using a Bluetooth or one of the IEEE 802 wireless communication protocols, e.g., 802.11a/b/g/i, 802.15, 802.16, 802.20, Wi-Fi Protected Access (WPA), or WPA2) or long range (e.g., a mobile, cellular, and/or satellite-based wireless network; GSM, TDMA, CDMA, WCDMA networks or the like). The communication network can include wired communication links and/or wireless communication links. The communication network can include any combination of the above networks and/or other types of networks.

As noted above, the vehicle 100 can include the sensor system 120. The sensor system 120 can include one or more sensors. "Sensor" means any device, component and/or system that can detect, determine, assess, monitor, measure, quantify and/or sense something. The one or more sensors can be configured to detect, determine, assess, monitor, measure, quantify and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or other element of the vehicle 100 (including any of the elements shown in FIG. 1).

The sensor system 120 can include any suitable type of sensor. Various examples of different types of sensors will be described herein. However, it will be understood that the embodiments are not limited to the particular sensors described.

The sensor system 120 can include one or more environment sensors 121 configured to acquire, detect, determine, assess, monitor, measure, quantify and/or sense driving environment data. "Driving environment data" includes and data or information about the external environment in which a vehicle is located or one or more portions thereof. For example, the one or more environment sensors 121 can detect, determine, assess, monitor, measure, quantify and/or sense obstacles in at least a portion of the external environment of the vehicle 100 and/or information/data about such obstacles. Such obstacles may be stationary objects and/or dynamic objects. The one or more environment sensors 121 can detect, determine, assess, monitor, measure, quantify and/or sense other things in the external environment of the vehicle 100, such as, for example, lane markers, signs, traffic lights, traffic signs, lane lines, crosswalks, curbs proximate the vehicle 100, off-road objects, etc.

In one or more arrangements, the one or more environment sensors 121 can include one or more radar sensors 122, one or more LIDAR sensors 123, one or more sonar sensors 124, one or more cameras 125 (e.g., passive optical cameras), one or more thermal infrared sensors 126 (e.g., passive thermal infrared sensors), or one or more ultrasonic sensors 127, and/or one or more ranging sensors 128. The one or more environment sensors can be used to detect, determine, assess, monitor, measure, quantify and/or sense, directly or indirectly, the presence of one or more obstacles in the external environment of the vehicle 100, the position or location of each detected obstacle relative to the vehicle 100, the distance between each detected obstacle and the vehicle 100 in one or more directions (e.g. in a longitudinal direction, a lateral direction and/or other direction(s)), the elevation of each detected obstacle, the speed of each detected obstacle and/or the movement of each detected obstacle.

Alternatively or in addition, the sensor system 120 can include one or more vehicle sensors 129. The vehicle sensor(s) 129 can detect, determine, assess, monitor, measure, quantify and/or sense information about the vehicle 100 itself (e.g., position, orientation, speed, etc.).

The sensor system 120, the processor(s) 110, and/or one or more other elements of the vehicle 100 can be operable to control movements of one or more of the sensors of the sensor system 120. It should be noted that any of the sensors described herein can be provided in any suitable location with respect to the vehicle 100. For instance, one or more sensors can be located within the vehicle 100, one or more sensors can be located on the exterior of the vehicle 100 and/or one or more sensors can be located so as to be exposed to the exterior of the vehicle 100.

Returning to FIG. 1, the vehicle 100 can include an input system 130. An "input system" includes any device, component, system, element or arrangement or groups thereof that enable information/data to be entered into a machine. The input system 130 can receive an input from a vehicle occupant (e.g. a driver or a passenger). Any suitable input system 130 can be used, including, for example, a keypad, display, touch screen, multi-touch screen, button, joystick, mouse, trackball, microphone and/or combinations thereof.

The vehicle 100 can include an output system 135. An "output system" includes any device, component, system, element or arrangement or groups thereof that enable information/data to be presented to a vehicle occupant (e.g. a person, a vehicle occupant, etc.). The output system 135 can present information/data to a vehicle occupant. The output system 135 can include a display. Alternatively or in addition, the output system 135 may include one or more earphones and/or one or more speakers. Some components of the vehicle 100 may serve as both a component of the input system 130 and a component of the output system 135.

The vehicle 100 can include one or more modules. The modules can be implemented as computer readable program code that, when executed by a processor, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 150. The autonomous driving module(s) 150 can receive data from the sensor system 120 and/or any other type of system capable of capturing information relating to the vehicle 100 and/or the external environment of the vehicle 100. In one or more arrangements, the autonomous driving module(s) 150 can use such data to generate one or more driving scene models. The autonomous driving module(s) 150 can determine position and velocity of the vehicle 100. The autonomous driving module(s) 150 can determine the location of obstacles, obstacles, or other environmental features including traffic signs, trees, shrubs, neighboring vehicles, pedestrians, etc.

The autonomous driving module(s) 150 can receive, capture, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 in respect to its environment for use in either creating a map or determining the position of the vehicle 100 in respect to map data.

The autonomous driving module(s) 150 can determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 150 can cause, directly or indirectly, such autonomous driving maneuvers to be implemented. As used herein, "cause" or "causing" means to make, force, compel, direct, command, instruct, and/or enable an event or action to occur or at least be in a state where such event or action may occur, either in a direct or indirect manner. The autonomous driving module(s) 150 can execute various vehicle functions and/or to transmit data to, receive data from, interact with, and/or control the vehicle 100 or one or more systems thereof (e.g. one or more of vehicle systems 140).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more mechanisms, devices, elements, components, systems, and/or combination thereof, now known or later developed The processor(s) 110, the autonomous driving module(s) 150, and/or other module(s) can be operatively connected to communicate with the various vehicle systems 140 and/or individual components thereof. For example, returning to FIG. 1, the processor(s) 110 and/or the autonomous driving module(s) 150 can be in communication to send and/or receive information from the various vehicle systems 140 to control the movement, speed, maneuvering, heading, direction, etc. of the vehicle 100. The processor(s) 110 and/or the autonomous driving module(s) 150 may control some or all of these vehicle systems 140 and, thus, may be partially or fully autonomous.

For instance, when operating in an autonomous mode, the processor(s) 110 and/or the autonomous driving module(s) 150 can control the direction and/or speed of the vehicle 100. The processor(s) 110 and/or the autonomous driving module(s) 150 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels).

The vehicle 100 can include one or more actuators 155 to modify, adjust and/or alter one or more of the vehicle systems 140 or components thereof to responsive to receiving signals or other inputs from the processor(s) 110 and/or the autonomous driving module(s) 150. The one or more actuators 155 can include motors, pneumatic actuators, hydraulic pistons, relays, solenoids, and/or piezoelectric actuators, just to name a few possibilities.

According to arrangements described herein, one or more sensors of the sensor system 120 can be integrated into an existing housing or structure of the vehicle 100. Various non-limiting examples will now be described in connection with FIGS. 2-5. The description will be directed to one or more environment sensors 121 and existing housings and/or structures located at or near the forward end region 101 of the vehicle 100. However, it will be understood that arrangements described herein are not limited in this respects. Indeed, arrangements described herein can be used in connection with the vehicle sensors 129 and/or other sensors of the sensor system 120. Moreover, arrangements described herein can be used in connection with existing housings and/or structures located in other areas of the vehicle 100, such as at or near the rearward end region 102 of the vehicle 100 and/or on the lateral sides of the vehicle 100.

Figure 2:
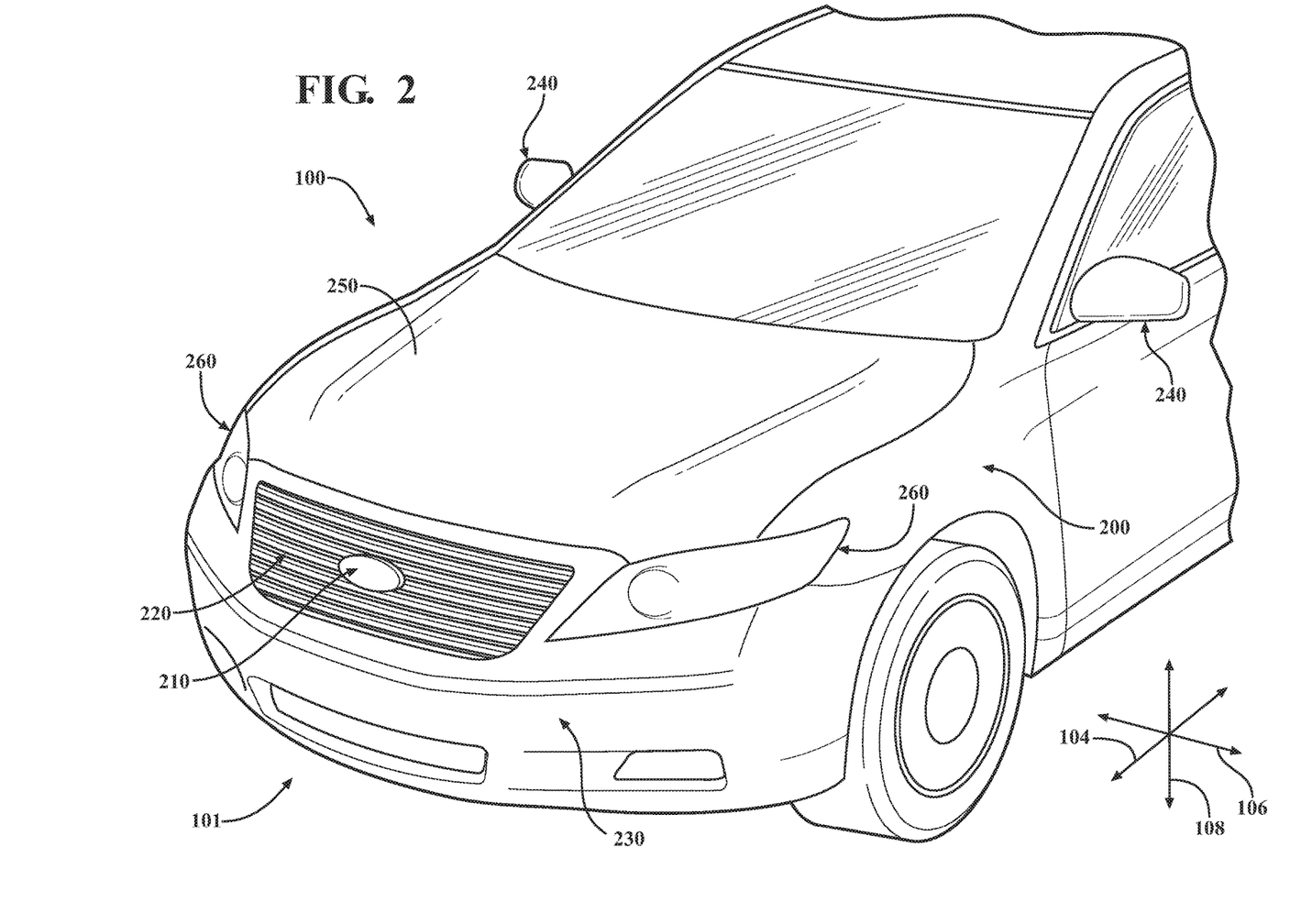
FIG. 2 is an example of a front end of a vehicle, showing an emblem and a front grille.

FIG. 2 shows an example of the forward end region 101 of the vehicle 100. The vehicle 100 can include a body 200, an emblem 210, a front grille 220, a front bumper 230, side mirrors 240, and/or a hood 250. Of course, it will be recognized that the vehicle 100 can have further elements or structures that can be found on vehicles. As will be described in further detail, one or more environment sensors can be integrated into the vehicle 100 in connection with one or more of these structures, such as the emblem 210, the front grille 220, and/or the side mirrors 240.

Figure 3:
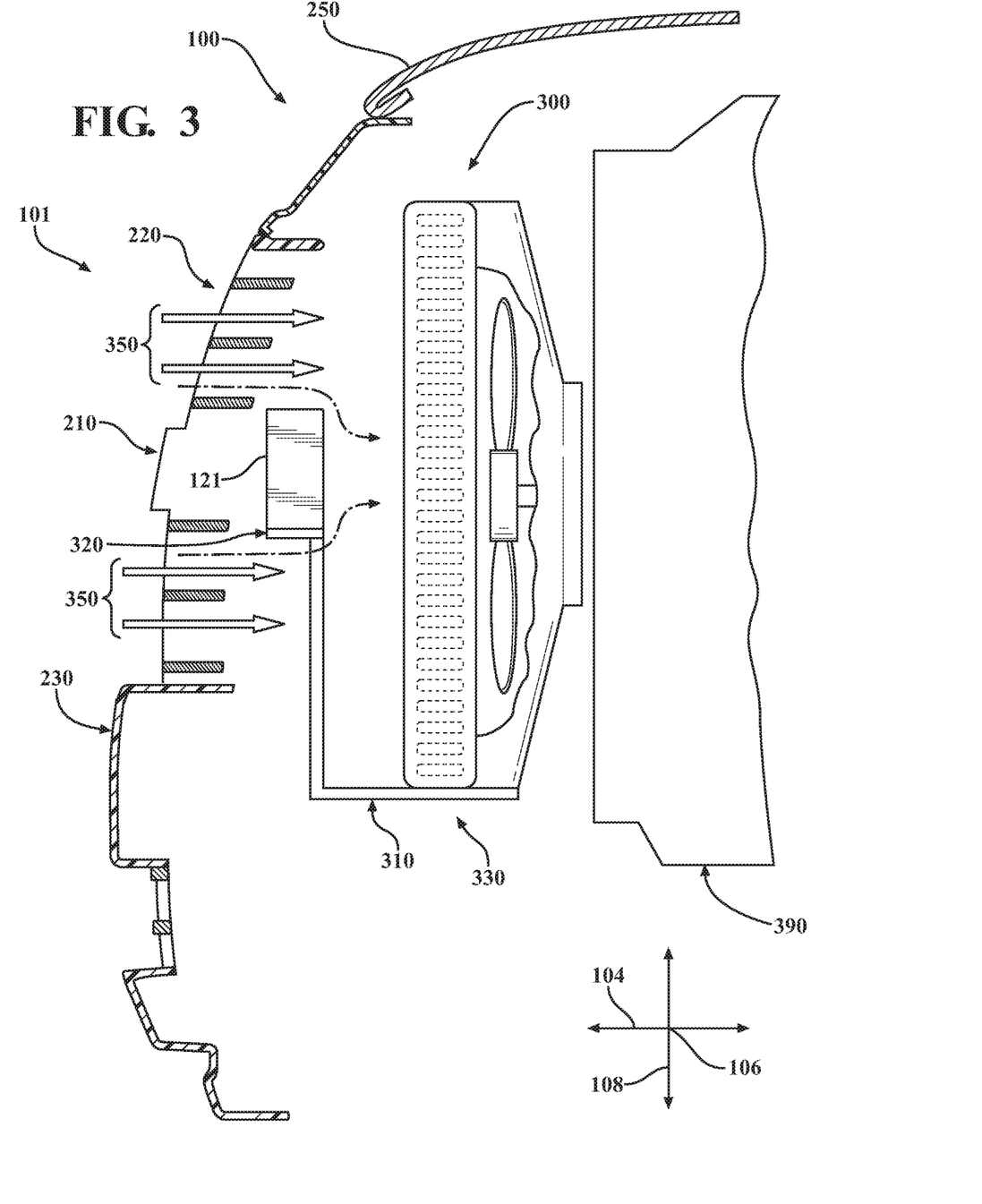
FIG. 3 is an example of a sensor system for a vehicle, showing one or more environment sensors located behind a solid vehicle emblem.
Figure 4:
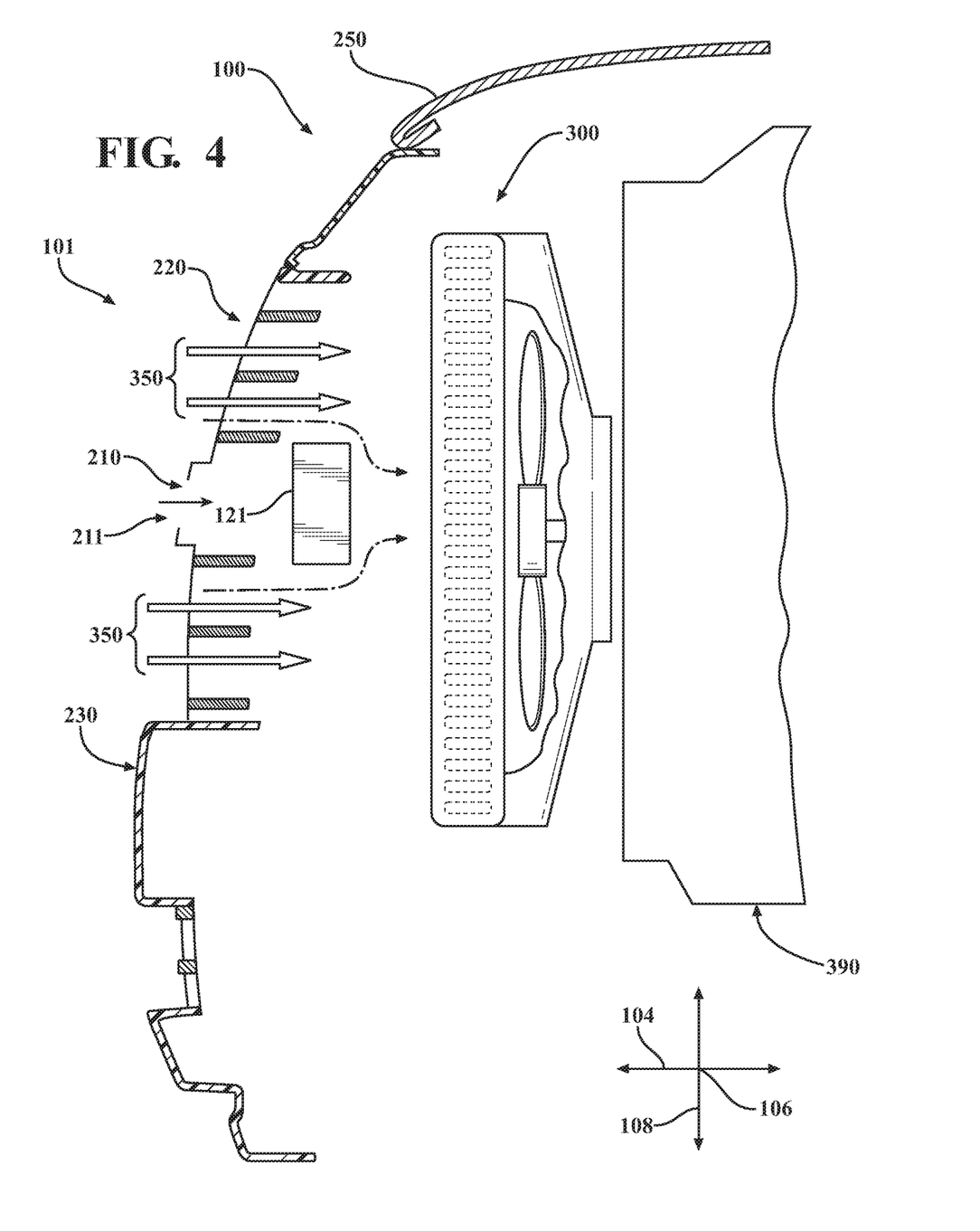
FIG. 4 is an example of a sensor system for a vehicle, showing one or more environment sensors located behind a vehicle emblem with one or more apertures.

FIGS. 3 and 4 show examples of arrangements in which one or more environment sensors 121 are located within the body 200 of the vehicle 100. More particularly, the one or more environment sensors 121 can be located behind the emblem 210 in the longitudinal direction 104 of the vehicle 100. The one or more environment sensors 121 can be spaced in the longitudinal direction 104 from the emblem 210. Still further, the one or more environment sensors 121 can be located in front of a radiator 300 of the vehicle 100 in the longitudinal direction 104. The one or more environment sensors 121 can be spaced in the longitudinal direction 104 from the radiator 300. The one or more environment sensors can be located above the front bumper in an elevation direction 108.

In the particular example shown, the emblem 210 can be located in a central region of the front grille 220. However, it will be appreciated that the emblem 210 can be provided in other locations. In some instances, the emblem 210 may not be provided in a location that overlaps the front grille 220. For example, the emblem 210 can be provided on the hood 250. The emblem 210 can be operatively connected to the vehicle 100 in any suitable manner, now know or later developed. The emblem 210 can have any suitable size, shape, and/or configuration. The emblem 210 can be made of any suitable material. The emblem 210 can be transparent, translucent, and/or opaque.

The one or more environment sensors 121 can be substantially aligned with the emblem 210. "Substantially aligned" can include instances in which the one or more environment sensors 121 are at substantially the same location in the elevation direction 108 as at least a portion of the emblem 210. "Substantially aligned" can include instances in which tan imaginary outline of the emblem 210 were projected in the longitudinal direction 104, then at least a portion of the one or more environment sensors 121 would overlap the imaginary outline of the emblem 210. In one or more arrangements, a majority of the one or more environment sensors 121 can overlap the imaginary outline of the emblem 210. In one or more arrangements, the one or more environment sensors 121 can be located entirely within the imaginary outline of the emblem 210. In one or more arrangements, the imaginary outline of the emblem 210 can be located entirely within the one or more environment sensors 121. "Substantially aligned" can include instances in which an axis of the emblem 210 extending in the longitudinal direction 104 passes through one or more of the environment sensors 121. In some arrangements, the emblem 210 can be offset from the one or more environment sensors 121 in one or more directions (e.g., in the lateral direction 106 and/or the elevation direction 108).

The one or more environment sensors 121 can be supported within the body 200 of the vehicle 100 in any suitable manner. For instance, the one or more environment sensors 121 can be operatively connected to one or more existing support structures (e.g., a plate, a bracket, a member, a bar, a rod, a connector, a frame, etc.). Examples of such operative connection can include one or more fasteners, one or more adhesives, and/or one or more forms of mechanical engagements, just to name a few possibilities. In one or more arrangements, the support structure can be a radiator support structure 310. The radiator support structure 310 can have any suitable configuration. For instance, the radiator support structure 310 can include a forward portion 320 and a rearward portion 330 relative to the longitudinal direction 104 of the vehicle 100. In one example, the one or more environment sensors 121 can be operatively connected to the forward portion 320 of the radiator support structure 310, and the radiator 300 can be operatively connected to the rearward portion 330 of the radiator support structure 310.

The one or more environment sensors 121 can be operatively positioned to sense at least a portion of the external environment of the vehicle 100 (e.g., at least a portion of a forward portion of the external environment of the vehicle 100) through the emblem 210. In one or more arrangements, the emblem 210 can be solid (e.g., free of apertures, free of windows, and/or opaque). FIG. 3 shows an example of the emblem 210 that is solid. In such case, the one or more environment sensors can be configured to sense at least a portion of the external environment of the vehicle through the emblem. For instance, the one or more environment sensors can be one or more radar sensors 122.

In one or more arrangements, the emblem 210 can include one or more apertures 211 (FIG. 4). In this context, the term apertures includes holes, cutouts, openings, windows, and/or transparent or translucent regions in the emblem 210. The aperture(s) 211 can have any suitable size, shape, and/or configuration. When the aperture(s) 211 are provided in the emblem 210, one or more of the environment sensors 121 can be operatively positioned to sense at least the portion of the external environment of the vehicle 100 through the aperture(s) 211. For instance, one or more cameras 125 can be positioned to acquire driving environment data of at least a portion of the external environment of the vehicle 100 through the aperture(s) 211.

With the one or more environment sensors 121 being located between the emblem 210 and the radiator 300 (or other cooling components (oil coolers, transmission cooler, etc.)), it will be appreciated that the one or more environment sensors 121 can, in at least some instances, be exposed to air 350 or other fluid that is inducted or otherwise received in the front grille 220. Such exposure can provide cooling to the one or more environment sensors 121. Depending on the position of the one or more environment sensors 121, air 350 can flow over at least a portion of the one or more environment sensors 121. In one or more arrangements, at least a portion of the air 350 can flow over a top portion of the one or more environment sensors 121. In one or more arrangements, at least a portion of the air 350 can flow over a bottom portion of the one or more environment sensors 121. In one or more arrangements, at least a portion of the air 350 can flow over one or more lateral portions of the one or more environment sensors 121. Of course, arrangements can be provided such that air 350 can flow over any combination of the above-noted portions of the one or more environment sensors 121.

When the vehicle emblem 210 includes the aperture(s) 211, additional cooling airflow can be provided to the one or more environment sensors 121. Alternatively or in addition, such arrangements can also facilitate cooling of an engine 390 of the vehicle 100. For instance, air 350 can flow through the aperture(s) 211 in the emblem 210, as is shown in FIG. 4. Due to such airflow through the emblem 210 and/or the one or more environment sensors 121 being located rearward of the emblem 210 in the longitudinal direction 104, airflow to the radiator 300 for cooling can be facilitated, which, in turn, can improve engine cooling. Further, in some instances, such arrangements can reduce effects on vehicle styling (e.g., smaller holes in the front grille 220 can be provided). In some instances, such arrangements can reduce the effects on the coefficient of drag of the airflow to the radiator 300.

Figure 5A:
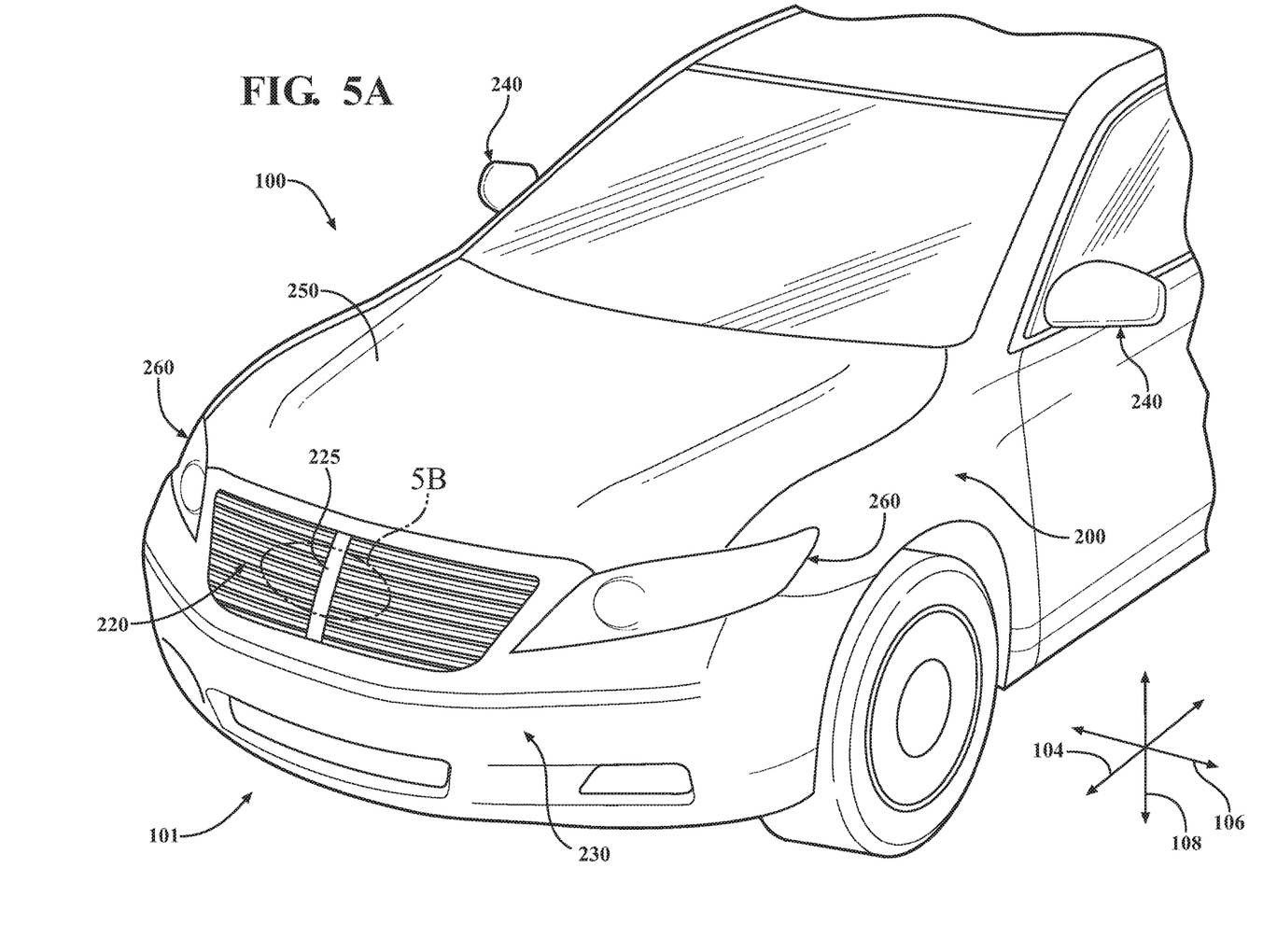
FIG. 5A is an example of a front end of a vehicle, showing a front grille.
Figure 5B:
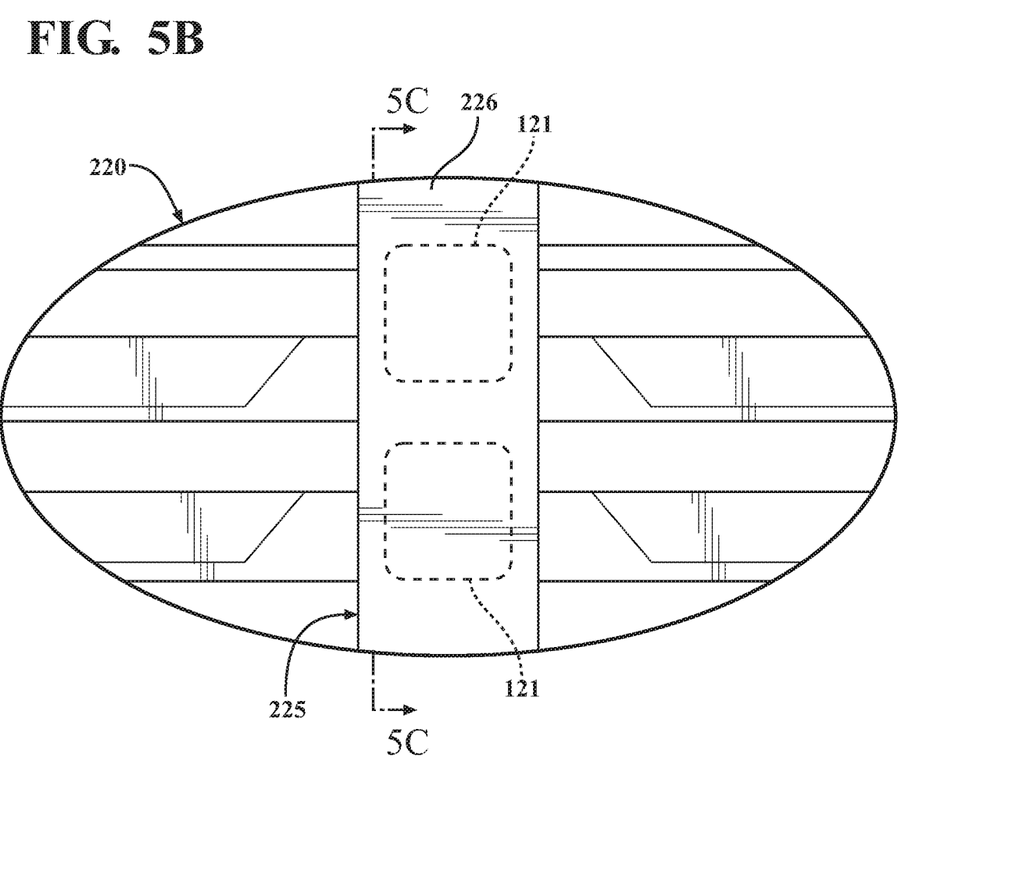
FIG. 5B is a close-up view of a portion of the front grill of the vehicle, showing one or more environment sensors located within a frame member of the front grille.
Figure 5C:
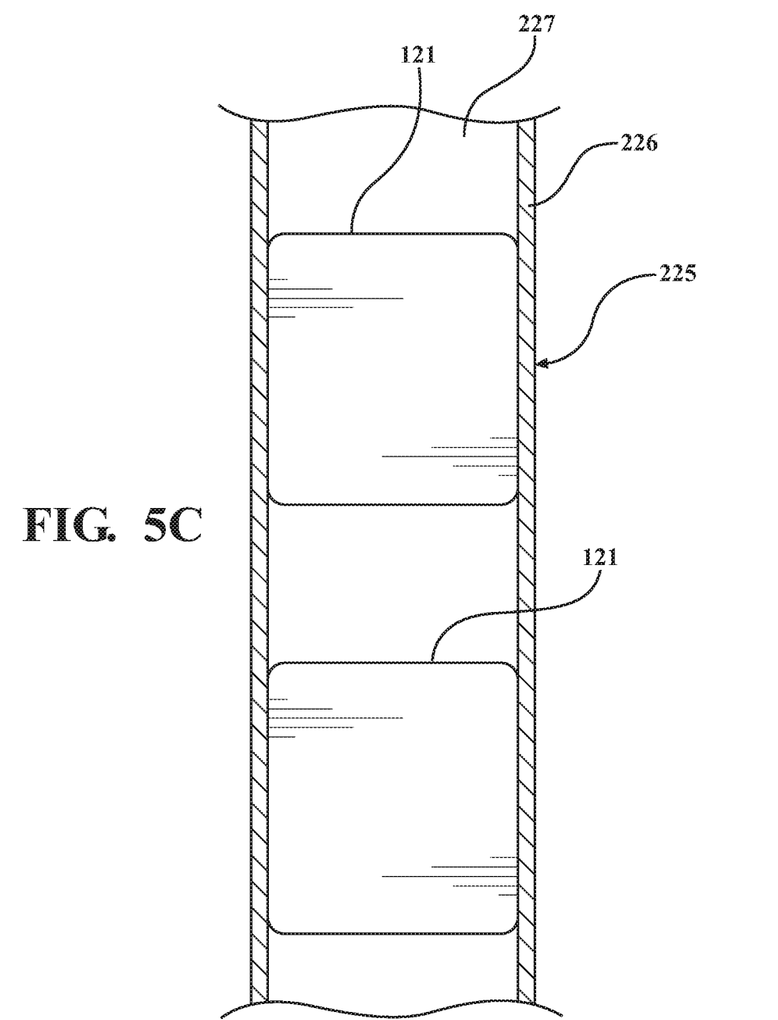
FIG. 5C is a cross-sectional view of a portion of the frame member of the front grill, viewed along line 5C-5C in FIG. 5B, showing one or more environment sensors located within a hollow portion of the frame member.

Referring to FIGS. 5A-5C, the one or more environment sensors 121 can be located within the front grille 220 of the vehicle 100. Referring to FIG. 5A, the front grille 220 can be operatively connected to the body 200 at the forward end region 101 of the vehicle 100 in any suitable manner, now known or later developed. The front grille 220 can be located above the front bumper 230 in the elevation direction 108.

The front grille 220 can have any suitable size, shape, and/or configuration. In one or more arrangements, at least a portion of the front grille 220 can be hollow. The one or more environment sensors 121 can be located within a frame member 225 of the front grille 220, such as in a hollow portion or an interior hollow space 227 (FIG. 5C) thereof. In one or more arrangements, the one or more environment sensors 121 can be operatively connected to the front grille 220 in any suitable manner, including one or more fasteners, one or more adhesives, frictional engagement, and/or one or more forms of mechanical engagement, just to name a few possibilities. In one or more arrangements, the one or more environment sensors 121 can be housed within the front grille 220 without being attached to the front grille 220. 5B is a close-up view of a portion of the front grill 220, as indicated in FIG. 5A. While this portion is generally-oval shaped, it will be understood that this is shape is not indicative of an emblem.

The one or more environment sensors 121 can be configured to sense at least a portion of an external environment of the vehicle 100 through a wall 226 of the front grille 220. In one or more arrangements, the wall 226 can be a solid walls. In such case, the one or more environment sensors 121 can be configured to and/or operatively positioned to sense through the wall 226. In one or more arrangements, the wall 226 front grille can include one or more apertures formed therein. In such case, the one or more environment sensors 121 can be configured to and/or operatively positioned to sense through the aperture(s).

With the one or more environment sensors 121 being located between the front grille 220 and the radiator 300, it will be appreciated that the one or more environment sensors 121 can, in at least some instances, be exposed to air or other fluid that is inducted or otherwise received in the front grille

220. Depending on the position of the one or more environment sensors 121, air 350 can flow over at least a portion of the one or more environment sensors 121. In one or more arrangements, at least a portion of the air 350 can flow over a top portion of the one or more environment sensors 121. In one or more arrangements, at least a portion of the air 350 can flow over a bottom portion of the one or more environment sensors 121. In one or more arrangements, at least a portion of the air 350 can flow over one or more lateral portions of the one or more environment sensors 121. Of course, the system can be configured such that air 350 flows over any combination of the above-noted portions of the one or more environment sensors 121.

It will be understood that one or more environment sensors 121 can be integrated into other existing vehicular structures. For instance, the one or more environment sensors 121 can be housed within a vehicular lamp assembly. The vehicular lamp can be a head lamp 260 (FIG. 2), a side-turn signal lamp, a high-mounted stop lamp, or a rear combination lamp. The one or more environment sensors 121 can be housed within a lamp housing of a vehicular lamp assembly. The lamp housing can be positioned higher than a front bumper 230 of the vehicle 100 in the elevation direction 108. In such location, the field of view of the one or more environment sensors 121 can, in one or more arrangements, be substantially similar to the field of illumination provided by the vehicular lamp.

In one or more arrangements, the vehicular lamp assembly can include a lamp, a translucent lens, and a plurality of side walls. The lamp housing can provide an enclosed environment. The one or more environment sensors 121 can be integrated into the vehicular lamp assembly in any suitable manner. For instance, the one or more environment sensors 121 can be a subcomponent of the vehicular lamp assembly, or the one or more environment sensors 121 can be standalone components in the vehicular lamp assembly.

As another example, the one or more environment sensors 121 can be housed within a side mirror 240 (FIG. 2) of the vehicle 100, as is shown in FIG. 2. The side mirror 240 can be a side mirror assembly that includes a housing. The side mirror assembly can be positioned above the front bumper 230 of the vehicle 100 in the elevation direction 108. The field of view of the one or more environment sensors in such location can, in one or more arrangements, be in a forward and/or rearward longitudinal direction 104 and/or in a right and/or left lateral direction 106 of the vehicle 100. In one or more arrangements, the side mirror assembly can include a housing and a mirror. The housing can provide an at least partially enclosed environment. The one or more environment sensors 121 can be integrated into the side mirror assembly in any suitable manner. For instance, the one or more environment sensors 121 can be a subcomponent of the side mirror assembly, or the one or more environment sensors 121 can be standalone components.

Now that the various potential systems, devices, elements and/or components have been described, one or more examples of using such systems, devices, elements and/or components will now be described. The vehicle 100 can be traveling in an environment. The vehicle 100 can be a highly-automated, autonomous vehicle. The vehicle 100 can be following a planned path between an origin and a destination.

As the vehicle 100 travels along its planned path, the vehicle 100 can sense the external environment using the environment sensor(s) 121. At least a portion of a forward portion of the external environment can be sensed by the one or more sensors located behind the emblem 210, which can be solid or can include an aperture. In this example, the one or more sensors can include one or more radar sensors and/or one or more lidar sensors. The one or more sensors can acquire driving environment data.

The acquired driving environment data can be analyzed and/or used by the processor(s) 110, the autonomous driving module(s) 150, and/or other modules for any suitable purpose. For instance, the acquired driving environment data can be used to detect obstacles (e.g., static obstacles and/or dynamic obstacles) in the external environment and/or information about such obstacles (e.g., size, current and/or predicted speed, current and/or predicted location, current and/or predicted movement, current and/or predicted trajectory, etc.). Alternatively or in addition, the processor(s) 110, the autonomous driving module(s) 150, and/or other modules can be determine one or more driving maneuvers for the vehicle 100 based at least in part on the acquired driving environment data. The one or more driving maneuvers can be determined to avoid collision or minimize/reduce the risk of collision with obstacles detected in the external environment.

In one or more arrangements, the vehicle 100 can recommend the determined one or more driving maneuvers to a driver of the vehicle 100. Alternatively or in addition, the vehicle 100 can be caused to implement the determined driving maneuver. Such causing can be performed by the autonomous driving module(s) 150, the processor(s) 110, and/or other module(s). The autonomous driving module(s) 150, the processor(s) 110, and/or other module(s) can be operatively connected to one or more of the vehicle systems 140 to implement the determined driving maneuver. In one or more arrangements, the autonomous driving module(s) 150, the processor(s) 110, and/or other module(s) can be configured to control the one or more actuators 155, which can control one or more of the vehicle systems 140 or portions thereof to implement the determined driving maneuver.

It will be appreciated that arrangements described herein can provide numerous benefits, including one or more of the benefits mentioned herein. For example, arrangements described herein can facilitate improved sensing of an external environment of the vehicle. Arrangements described herein can enhance the field of view of the one or more environment sensors. Further, arrangements described herein can use existing vehicle housings or structures, thereby avoiding or minimizing the need to provide a separate housing or attachment structures for the one or more sensors. Still further, arrangements described herein can reduce the overall amount of space taken by the sensors in the vehicle. In addition, arrangements described herein can provide for a streamlined, integrated appearance to a user. Arrangements described herein can take advantage of standard air inflows to the vehicle to cool the one or more sensors. Arrangements described herein can facilitate airflow to a vehicle radiator, thereby improving engine cooling.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A sensor system for a vehicle comprising:
a vehicle emblem, an aperture being defined solely by the vehicle emblem, whereby the aperture is not defined by a front grille of the vehicle;
a radiator located rearward from the vehicle emblem in a longitudinal direction of the vehicle; and
one or more sensors located between the vehicle emblem and the radiator, the one or more sensors being spaced rearward from the vehicle emblem in the longitudinal direction of the vehicle, the one or more sensors being substantially aligned with the vehicle emblem, the one or more sensors are configured to sense at least a portion of an external environment of the vehicle, whereby the aperture facilitates airflow to the one or more sensors and to the radiator for engine cooling; and
a radiator support structure, the one or more sensors being connected to a forward portion of the radiator support structure and the radiator being connected to a rearward portion of the radiator support structure.

2. A sensor system for a vehicle comprising:
a vehicle, the vehicle including:
a forward end region including a front end;
a rearward end region including a rear end;
a vehicle body, the vehicle body defining an opening in the forward end region of the vehicle; and
a front grille, the front grille including a frame member, the frame member being elongated in a substantially vertical direction, at least a portion of the frame member being hollow and defining an interior hollow space, the front grille and the frame member being received within the opening, the front grille being connected to the vehicle body in the forward end region, a front portion of the frame member defining a portion of an exterior of the vehicle in the forward end region, the front grille being located forward of an engine compartment of the vehicle, the front grille being configured to allow air from outside the vehicle to flow through the front grille and into an interior region of the vehicle body; and
one or more sensors being housed within the interior hollow space of the frame member, the one or more sensors are configured to sense at least a portion of an external environment of the vehicle through a wall of the frame member, the wall being solid, whereby the wall does not include apertures, and whereby the one or more sensors do not sense the external environment of the vehicle through any vehicle emblem.

3. The sensor system of claim 1, wherein the one or more sensors include one or more lidar sensors.

4. The sensor system of claim 1, wherein the one or more sensors include one or more radar sensors.

5. The sensor system of claim 1, wherein the one or more sensors include one or more passive optical cameras, one or more passive thermal infrared sensors, one or more sonar sensors, or one or more ultrasonic sensors.

6. The sensor system of claim 2, further including a front bumper located in the forward end region of the vehicle body, and wherein the one or more sensors are located above the front bumper in an elevation direction.

7. The sensor system of claim 2, wherein the vehicle is an autonomous vehicle, and further including a processor operatively connected to the one or more sensors, and wherein the processor is configured to maneuver the vehicle based at least in part on data acquired by the one or more sensors.

8. The sensor system of claim 1, further including a front bumper located at a forward end of a vehicle body, and wherein the one or more sensors are located above the front bumper in an elevation direction.

9. The sensor system of claim 1, wherein the vehicle is an autonomous vehicle, and further including a processor operatively connected to the one or more sensors, and wherein the processor is configured to maneuver the vehicle based at least in part on data acquired by the one or more sensors.

10. The sensor system of claim 1, wherein the one or more sensors are operatively positioned to sense the at least a portion of the external environment of the vehicle through the aperture in the vehicle emblem.

11. The sensor system of claim 1, wherein the one or more sensors include one or more lidar sensors.

12. The sensor system of claim 1, wherein the one or more sensors include one or more radar sensors.

13. The sensor system of claim 1, wherein the one or more sensors include one or more passive optical cameras, one or more passive thermal infrared sensors, one or more sonar sensors, or one or more ultrasonic sensors.

14. The sensor system of claim 1, wherein the vehicle includes a front grille, and wherein the one or more sensors are operatively positioned so that air received in the front grille passes over at least a top portion and a bottom portion of the one or more sensors.

* * * * *

UNITED STATES PATENT AND TRADEMARK OFFICE
CERTIFICATE OF CORRECTION

PATENT NO. : 10,589,694 B2  
APPLICATION NO. : 15/186389  
DATED : March 17, 2020  
INVENTOR(S) : Paxton S. Williams and Christopher M. Higgins Page 1 of 1

It is certified that error appears in the above-identified patent and that said Letters Patent is hereby corrected as shown below:

In the Claims

Claim 3, Column 14, Line 4: delete "system of claim 1" and insert --system of claim 2--

Claim 4, Column 14, Line 6: delete "system of claim 1" and insert --system of claim 2--

Claim 5, Column 14, Line 8: delete "system of claim 1" and insert --system of claim 2--

Signed and Sealed this  
Twelfth Day of May, 2020

Andrei Iancu  
*Director of the United States Patent and Trademark Office*